US011328340B1

(12) United States Patent
Simon et al.

(10) Patent No.: US 11,328,340 B1
(45) Date of Patent: May 10, 2022

(54) IMAGE RECOGNITION PRODUCT ORDERING SYSTEM AND METHOD

(71) Applicant: Omaha Steaks International, Inc., Omaha, NE (US)

(72) Inventors: Bruce A Simon, Omaha, NE (US); David W Markle, Omaha, NE (US)

(73) Assignee: Omaha Steaks International, Inc., Omaha, NE (US)

( * ) Notice: Subject to any disclaimer, the term of this patent is extended or adjusted under 35 U.S.C. 154(b) by 260 days.

(21) Appl. No.: 16/009,841

(22) Filed: Jun. 15, 2018

(51) Int. Cl.
*G06Q 30/00* (2012.01)
*G06Q 30/06* (2012.01)
*G06K 9/62* (2022.01)
*G06V 10/40* (2022.01)

(52) U.S. Cl.
CPC ....... *G06Q 30/0633* (2013.01); *G06K 9/6201* (2013.01); *G06Q 30/0623* (2013.01); *G06V 10/40* (2022.01); *G06Q 30/0641* (2013.01)

(58) Field of Classification Search
CPC ........... G06Q 30/0633; G06Q 30/0623; G06Q 30/0641; G06K 9/6201; G06V 10/40
USPC ................................................ 705/26.1–27.2
See application file for complete search history.

(56) References Cited

U.S. PATENT DOCUMENTS

| | | | |
|---|---|---|---|
| 8,051,079 B2 | 11/2011 | Cheng et al. | |
| 9,536,243 B2 | 1/2017 | Khan | |
| 2005/0015310 A1 | 1/2005 | Frantz et al. | |
| 2009/0240735 A1* | 9/2009 | Grandhi | G06F 16/434 |
| 2012/0173351 A1 | 7/2012 | Hanson et al. | |
| 2014/0067619 A1 | 3/2014 | Heimbach | |
| 2014/0244392 A1 | 8/2014 | Chang | |
| 2015/0324882 A1 | 11/2015 | Ouimet | |
| 2016/0300217 A1 | 10/2016 | Gravovski et al. | |
| 2016/0364789 A1 | 12/2016 | Lyman et al. | |

FOREIGN PATENT DOCUMENTS

| | | |
|---|---|---|
| DE | 19953719 A1 | 5/2001 |
| JP | 2012014511 A | 1/2012 |
| NL | 2012522 | 1/2013 |

OTHER PUBLICATIONS

Baker, Natasha, New apps help shoppers identify items using image recognition, Reuters, Aug. 26, 2013, pp. 1-4, http://www.reuters.com/article/us-apps-pounce-idUSBRE97P06J20130826.
Etherington, Darrell, Amazon Puts Image Recognition Into Its Main iOS App—Prepare to Be Even More Showroomed, Retailers, techcrunch.com, Feb. 6, 2014, pp. 1-5, https://techcrunch.com/2014/02/06/amazon-puts-mage-recognition-into-its-main-ios-app-prepare-to-be-even-more-showroomed-retailers/.

* cited by examiner

*Primary Examiner* — Anand Loharikar
(74) *Attorney, Agent, or Firm* — Avek IP, LLC; Mark C. Young

(57) ABSTRACT

A system for image recognition product ordering includes a communications link that receives a digital image of a printed advertisement of one or more products. An image recognition engine identifies one or more products depicted in the captured image and compares the identified products with depictions of products stored on a storage device. An order initiation unit correlates the one or more identified products with offers for sale of those products and initiates an order of the product. In alternative embodiments, a user of the system is presented with one or more offers for selections, if further embodiments the offer is a subscription-based order for recurring delivery of a product. A corresponding method is also disclosed.

7 Claims, 9 Drawing Sheets

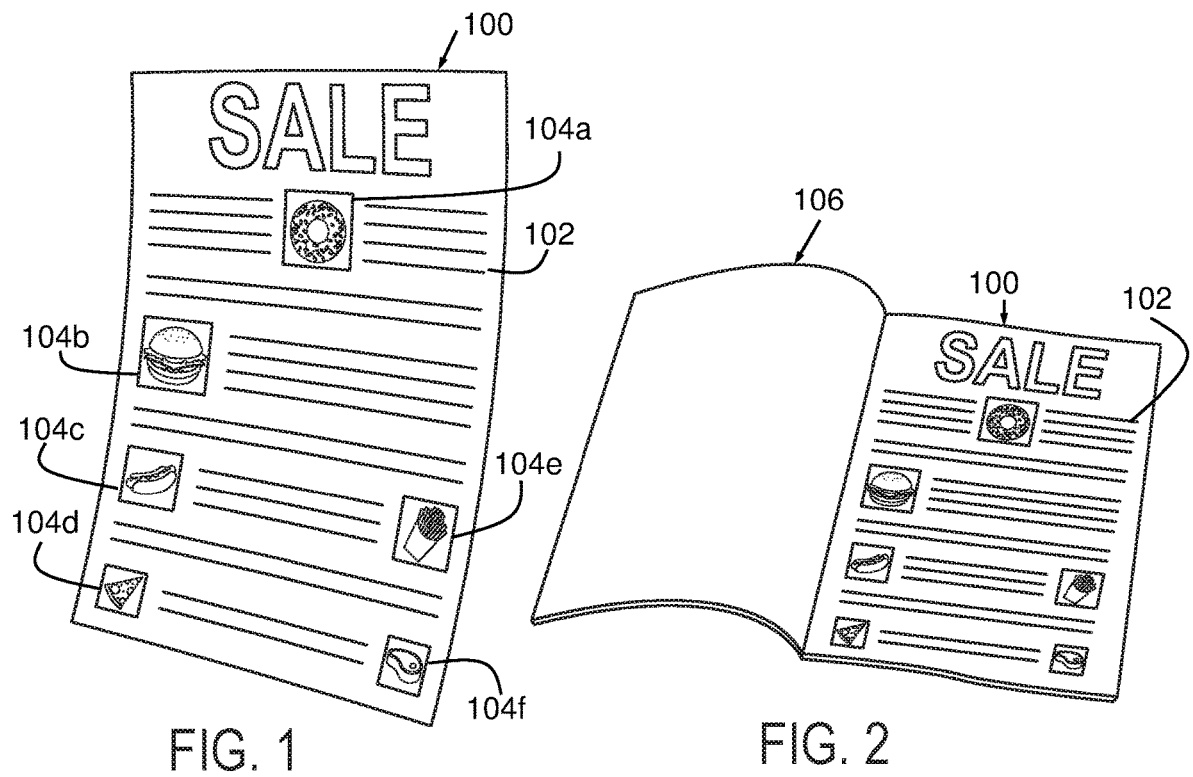
FIG. 1
FIG. 2
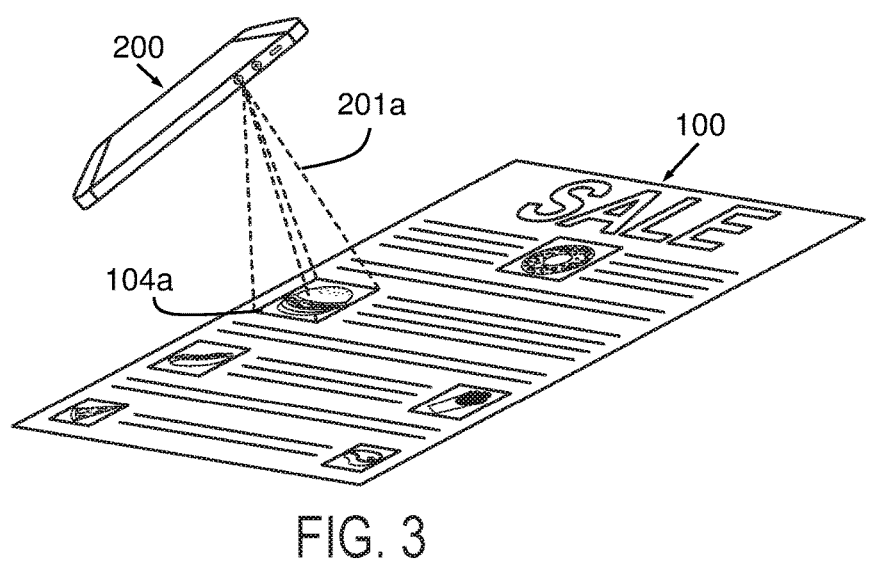
FIG. 3

IMAGE RECOGNITION PRODUCT ORDERING SYSTEM AND METHOD

BACKGROUND

Barcodes and QR codes are ubiquitous in the United States and elsewhere as a means for identifying specific products or services. For example, most physical products offered for sale are assigned a universal product code (UPC) that uniquely identifies that particular product. Manufacturers of products include the UPC on product labeling, usually encoded in the form of a one-dimensional barcode. Product scanners capable of reading barcodes from products are employed by merchants in their checkout registers, the scanners and checkout registers are operable to detect the barcode on the product and to correlate the encoded UPC with a price for the product as well as to track store inventory based on sold products.

Similarly, two dimensional barcodes and QR codes are used to encode information correlating to a product, service, or manufacturer. Thus, for example, a user of a cell phone can scan a QR code provided by a merchant—such as a QR code placed on a display at a merchant location, or a QR code printed in a magazine ad by a merchant—and be directed to a web page having further information about that merchant. Likewise, QR codes can direct a user to information about a specific product, service or merchant, or to information about deals, contests, or other information related to the product, service or merchant.

While useful, the use of conventional barcodes and QR codes to identify products and to direct consumers to product information suffer from numerous drawbacks. For example, a UPC code for a product must be associated with a specific product and registered with a UPC registry, with each individual product typically requiring a unique UPC. In addition, product packaging or labeling must be designed or updated with a barcode encoding that unique UPC. Thus, if a manufacturer makes changes to a product, that change typically necessitates obtaining a new UPC code and updating the product packaging.

Furthermore, the use of barcodes and QR codes in advertising material usually results in an aesthetically unpleasing appearance of printed advertisements. For example, if a manufacturer or merchant wants to include separate QR codes relating to numerous separate products depicted on a single page of advertising, the resulting print and/or image advertising is dotted with multiple QR codes, detracting from images of the actual products and interrupting the flow of text and other information on the page. And, current usage of QR codes typically simply directs a consumer or potential customer to general product information page at a website—the customer must then take additional steps to actually order products from the website, if ordering is allowed at all.

Thus, it can be seen that there remains a need in the art for a robust and unobtrusive method for identifying products in print advertisements, brochures, and mailers without relying on UPC or QR codes, and for providing customers with a method for easily ordering and obtaining those advertised products.

SUMMARY

Embodiments of the invention are defined by the claims below, not this summary. A high-level overview of various aspects of the invention is provided here to introduce a selection of concepts that are further described in the Detailed Description section below. This summary is not intended to identify key features or essential features of the claimed subject matter, nor is it intended to be used in isolation to determine the scope of the claimed subject matter. In brief, this disclosure describes various embodiments of systems and methods for identifying depictions of products in printed advertisements, correlating the depictions associated with those products with offers for sale of those products, and placing orders or subscriptions for those products by a user of the system.

In one embodiment, the system includes a communications link operable to connect a user device to a central system via a network interface. The central system receives a digital image from a user of the system over the communications link, with the digital image comprising an image of a printed advertisement, or a portion of that advertisement, having depictions associated with one or more products offered for sale by the advertiser. A storage device in communication with the central system stores a plurality of product depictions and a plurality of purchase or subscription offers associated with those product depiction, as well as information associated with users of the system. Upon receipt of the captured digital image from a user, an image recognition engine identifies the product depictions in the advertising image and correlates those depictions with products, offers, and combinations of products and offers ions stored in the storage device. Based on a match or correlation between a product depicted in the advertisement and identified by the image recognition engine and, based on information associated with the user of the system, an order initiation unit presents to a user one or more offers for products associated with the depictions in the printed advertisement image captured by the user. If no depictions are detected in the captured image, or if no offers are indicated in the central system as being associated with a particular user, then the user may be presented with a general catalog or order page without specific offers. Upon selecting one or more offers presented, a user completes the order by selecting an order initiation button and the order process is completed.

In alternative embodiments, the order is a one-time order of a product or a subscription order for periodic delivery of a product, or combinations thereof.

In further alternative embodiments, users log-in to the system using an identifying username and/or password using a remote device, such as a smartphone executing a web browser or application, the device having an image capturing device or camera operable to capture a digital image of the printed advertisement and to transmit the captured image to the communications link.

In further preferred embodiments, offers presented to a user are tailored to that specific user based on the advertisement sent to that user (as determined by identification of specific product images in that advertisement) and/or based on information related to the user, such as geographic location, purchase history, etc; stored in the storage device of the central system and associated with that user.

In alternative embodiments the images presented in the advertisement may be photographs, drawings, or other depictions of the product or may be whimsical images or other images not of the specific product, but images related to or indicative of the product. In other embodiments, the product and offer associated with an image in the advertisement may not be readily apparent to a user viewing the advertisement, with the image recognition engine recognizing and associating the image with one or more offers that are presented to a user.

DESCRIPTION OF THE DRAWINGS

Illustrative embodiments of the invention are described in detail below with reference to the attached drawing figures, and wherein:

FIG. 1 is a perspective view of a page of a printed advertisement or promotional brochure having depictions of products interspersed among other printed indicia on the page for use with a system and method in accordance with an exemplary embodiment of the present invention.

FIG. 2 is a perspective view of an alternative embodiment of the printed advertisement or promotional brochure of FIG. 1 with the page forming a part of a larger collection of printed pages, such as a magazine.

FIG. 3 is a perspective view of user device capturing a digital image of a portion of the printed page of FIG. 1 in accordance with an exemplary embodiment of the system and method of the present invention.

DETAILED DESCRIPTION

Figure 4:
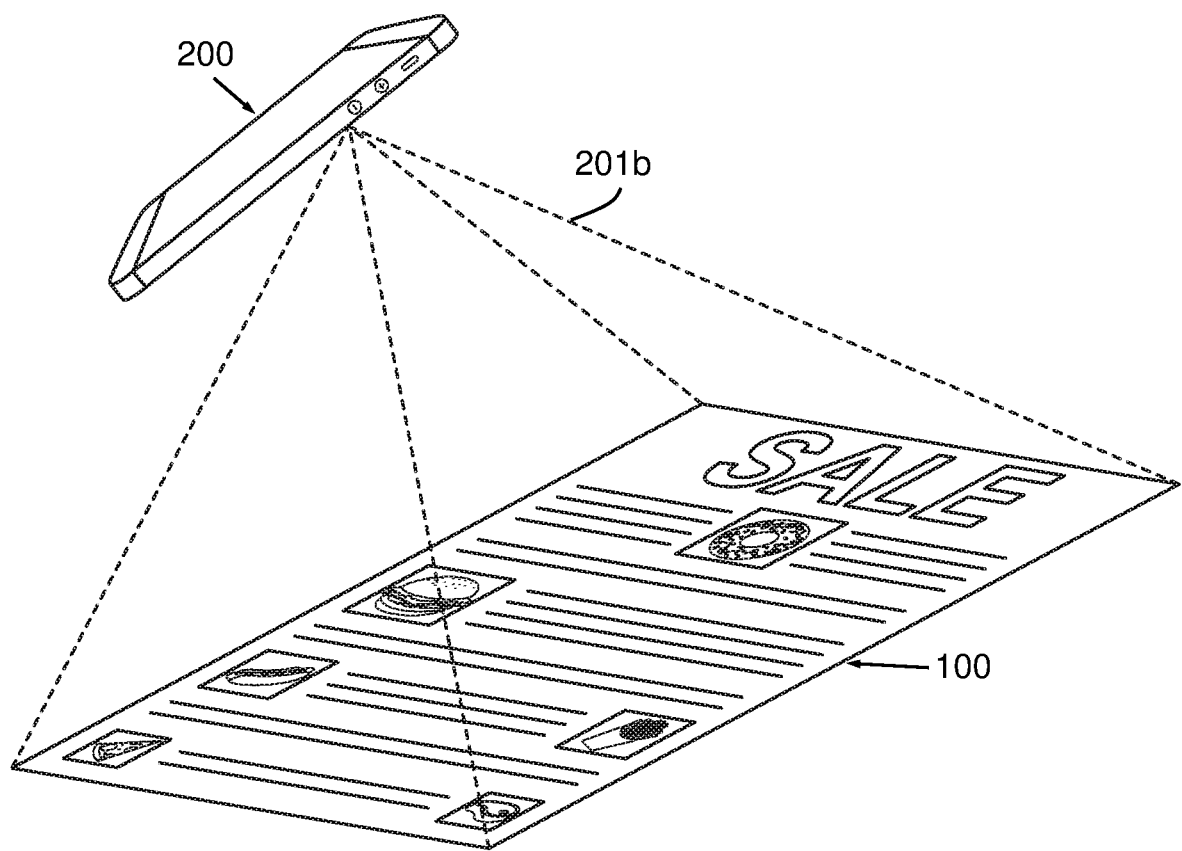
FIG. 4 is a perspective view of a user device capturing a digital image of the entire printed page of FIG. 1 in accordance with an alternative embodiment of the system and method of the present invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

Embodiments of the invention include devices, apparatus, systems, and methods for ordering product, or subscribing to periodic delivery of product, using image recognition to identify one or more depictions associated with one or more products from a printed medium, such as an advertising mailer, brochure, newspaper insert, or magazine page. Various embodiments of the claimed system and method employ various techniques for capturing a digital image of the printed medium, or a portion thereof, identifying one or more depictions within the captured digital image, associating the identified depictions with one or more products available for order and/or with one or more offers for one or more products, and initiating a one time or recurring order of product based on the identified depictions and associated offers.

In preferred embodiments, the offers are further associated with particular identified users of the system, so that offers can be made to individual customers, or to groups or tiers of customers based on various criteria, with order and payment information associated with the user available to expedite the ordering process.

Looking first to FIGS. 1 and 2, an exemplary printed product advertisement for use with the system and method of the present invention is depicted generally by the numeral 100. The printed product advertisement comprises various printed indicia, including printed textual indicia and various image indicia 104a, 104b, 104c, 104d, 104e, 104f comprising depictions of various products. In the exemplary embodiment depicted, the printed product advertisement includes depictions of various food products available for order. Thus, the printed product advertisement 100 is representative of an advertising brochure a consumer may receive in a private mailing, in an advertising pack mailing, as a newspaper insert, or in any manner typically used to distribute product mailings.

In one exemplary embodiment of the present invention, the printed product advertisement 100 is tailored to a particular consumer and user of the system and method claimed herein, with offers associated with the depicted products directed to that particular consumer with a printed advertising mailer sent specifically to that consumer. In other embodiments of the present invention, the offers associated with the product depictions are directed to a group of consumers, all of whom receive an identical, or nearly identical, mailer. In other embodiments, the printed product advertisement 100 is mass distributed, such as in a magazine or newspaper, with every consumer receiving an identical or nearly identical version. For example, as seen in FIG. 2, the printed product advertisement is included in a bound magazine style publication 106, such as a magazine or product catalog.

Looking still to FIGS. 1 and 2, it should be understood that the printed product advertisement 100 may be directed to various industries and channels of trade, and that the system and method of the present invention are not restricted to any specific product type. For example, the product depictions 104a, 104b, 104c, 104d, 104e, 104f shown in FIG. 1 are all food items, such as may be offered by a food seller. However, the system and method of the present invention may equally be used in other product areas, such as by a more specialized seller of meat products, in which case the product depictions would be tailored to represent those specific products, or by a general department store seller in which case the product depictions could be tailored to represent various general products.

It should be further understood (and as will be described in more detail herein below) that while the product depictions 104a, 104b, 104c, 104d, 104e, 104f are associated with a particular product, the product depictions need not necessarily exactly or explicitly depict that product. For example, while product depiction 104b in FIGS. 1 and 2 depicts a cooked and assembled hamburger, that hamburger image may be associated by the image recognition engine of the system and method of the present invention with bulk ground beef, beef patties, or other desired products. Or, the image may be of a related or fanciful depiction, such as a gift box, knife and fork place setting, etc. Regardless of the depiction, the image recognition engine will associate that depiction with the desired product(s) and offer(s) as defined by the operator of the central system, e.g., the party offering the products and providing the printed advertisement.

Turning again to FIGS. 1 and 2, it should be apparent that the layout of the page, with images interspersed among textual descriptions, does not include any QR codes, barcodes, or other strictly utilitarian product descriptors. Thus, the printed product advertisement 100 can be arranged in an aesthetically pleasing manner, without the intrusion of QR and barcodes. For example, the printed product advertisement may be formatted as a conventional magazine article, with textual description interspersed with images corresponding to the textual description.

In other exemplary embodiments, the product depictions may be accompanied by text specifically describing an offer associated with that depiction to direct a consumer user to a specific offer.

In either case, the image recognition engine and system and method of the present invention will identify the product depictions within that article and associate those product depictions with products for sale and with offers associated with those products as will now be described.

Figure 5:
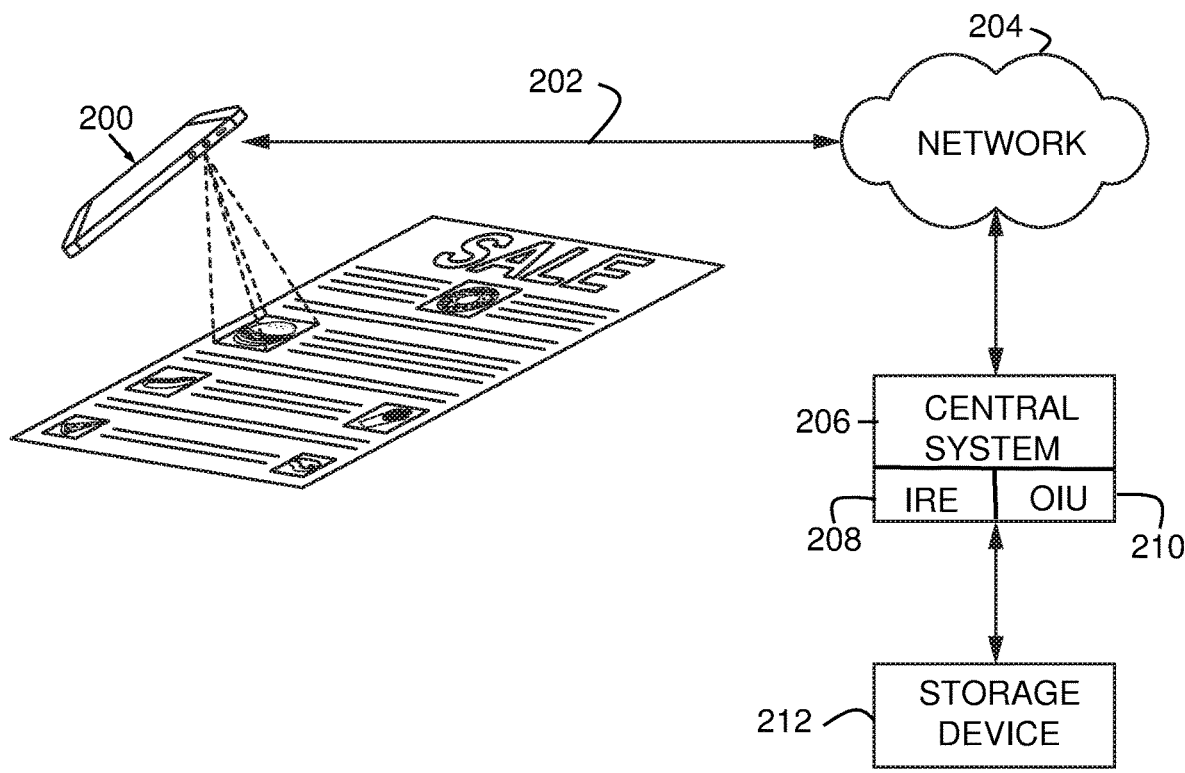
FIG. 5 is a diagrammatic view of a user device capturing a digital image of a portion of the printed page of FIG. 1 and in communication with a central system via a communications link and network, with the central system including an image recognition engine and order initiation unit in further communication with a storage device in accordance with an exemplary embodiment of the system and method of the present invention.

Looking to FIGS. 3 and 4, in an exemplary embodiment of the present invention, a user employs a smartphone 200 device having a camera with a field of view 201a, 201b to capture a digital image of a single product depiction 104a (FIG. 3) presented on the printed product advertisement 100, or of an entire page (FIG. 4) having multiple product depictions of the printed product advertisement. Looking to FIG. 5, the digital image captured by a user is transferred over a communications link 202, through a network 204, and to a central system 206 which comprises an image recognition engine 208 and an order initiation unit 210. The central system 206 is further in communication with a storage device 212.

It should be understood that the user's smartphone 200 may be any type of device allowing the user to capture digital images, such as digital cameras, tablets, or other image capturing devices, and need not necessarily include telephone functionality so long as the captured digital image can be transferred from the device, and preferably transmit those images via the communications link 202. In preferred embodiments, the user's smartphone 200 establishes communication with central system 206 via the communications link 202 and network 204 to allow a user to sign-in to the central system 206 using a username and password so that the system can identify the user and associate corresponding user information to expedite shipping and payment information, and to identify and associate any particular offers unique to that user.

Communications link 202 is preferably implemented via a Wi-Fi or Bluetooth protocol, with network 204 comprising any combination of local area networks (LANs) and wide area networks (WANs), such as the Internet, that allow communication between networked devices as is known in the art.

Central system 206 preferably comprises a processor, or multiple processors, configured as a server or group of servers operable to execute the image recognition engine 208 and order initiation unit 210 functionality.

Storage device 210 is a storage medium, such as a hard drive, operable to store user information such as names, addresses, and other contact information, as well as information related to offers available to particular users or to groups or tiers of users. Storage device 210 also stores product depictions associated with various products and/or offers for products, and is accessible by the image recognition engine to compare depictions within the digital image captured by a user with the stored product depictions to identify what products and offers are available for a particular user.

Central system 206 is preferably a server, or server system, operable to communicate over communications link 202 with a plurality of users, and to execute the image recognition engine 208 and order initiation unit 210 software applications, as well as to communicate with storage device 210. It should be further understood that the central system server(s) and storage device 210 may be integrated and co-located or may geographically dispersed. For example, the central system 206 and storage device 210 may be implemented in a cloud-based server system, with multiple servers providing the ability to communicate with multiple users of the system simultaneously as is known in the art.

With the printed product advertisement 100, user device 200, communications link 202, network 204, central system, image recognition engine 206, order initiation unit 208, and storage device 210 set forth, an exemplary operation of the system and method of the present invention will now be described, followed by a description of the system and method as viewed from a user's perspective using a smartphone device.

Figure 6:
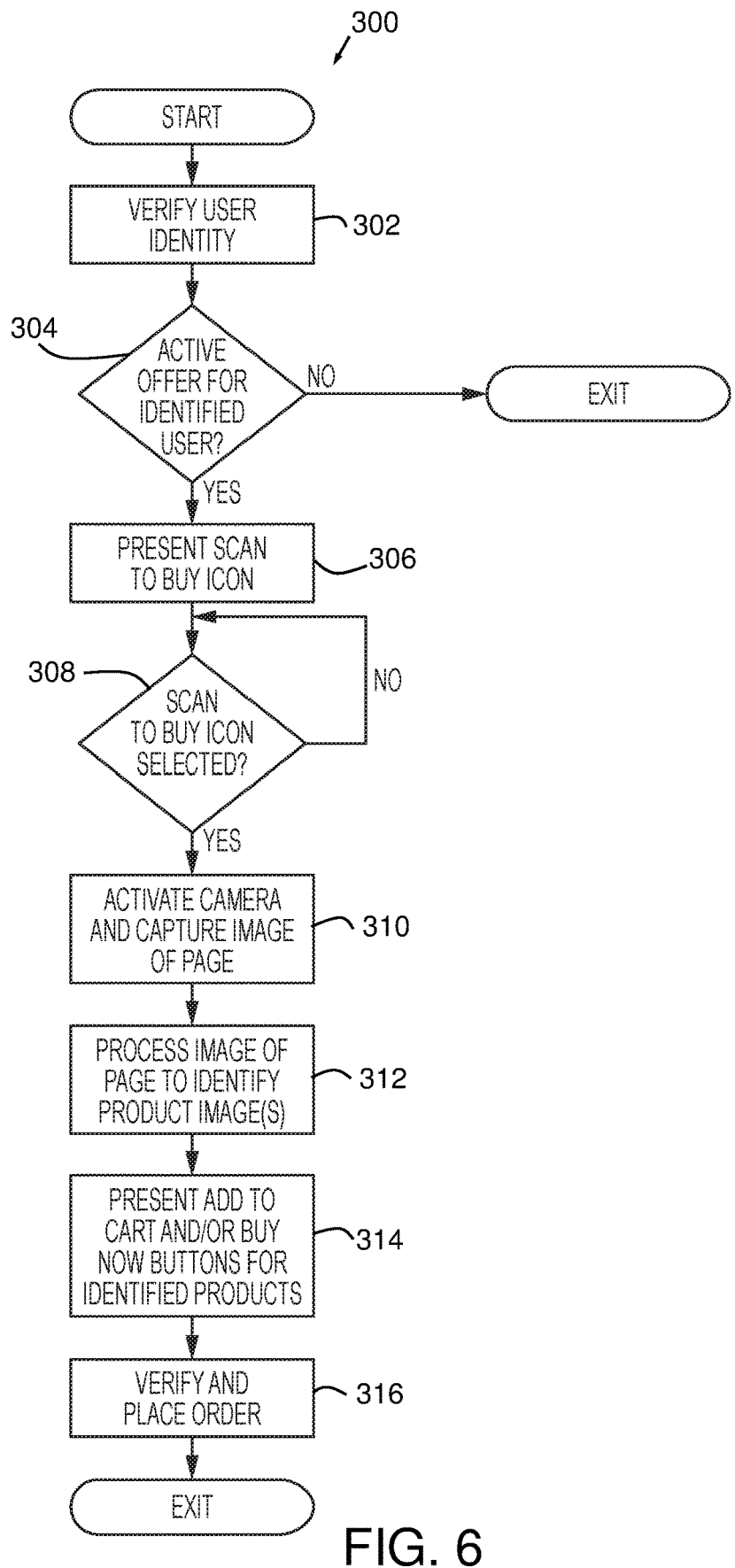
FIG. 6 is a flow diagram of product ordering using image recognition in accordance with an exemplary embodiment of the system and method of the present invention.

Turning to FIG. 6, a flow diagram of an exemplary method of ordering product for a specific user using image recognition in conjunction with the system described above is depicted generally as numeral 300. A user, using their smartphone device preferably with a specific application running on that device, is in communication with the central system 206 via the communications link 202 and network 204. As previously described, the central system 206 has information for each user stored on a storage device 212 and associates one or more product offers and one or more products with that user.

With a user signed-in to the central system 206 (as previously described), at block 302 the identity of the user is verified. Verification of a user is established via a user name, password, account name or number, or other methods as is known in the art. As is also known in the art, once signed-in the central system associates stored information with the user, including information such as the user's mailing address, email, and other contact information. With the identity of the user established and verified, at block 304 the central system 206 determines whether any specific offers are available for that user, such as offers that have been sent on a printed product advertisement to that specific user. Offers available to the user are preferably stored in the storage device 210 and accessible by the central server, associated with the user's identity. It should be understood that particular offers may be associated with a plurality of users so that multiple users receive an identical printed product advertisement, and that offers may be tailored to individual users, or to groups or tiers of users. For example, preferred customers may receive a different set of offers than lower tier customers.

At block 304, if no active offers are available for an identified user—e.g. the central system recognizes that no printed product advertisement having special offers was sent to the identified user—the method exits without presenting any particular special offers to that signed-in user. In that case the user preferably remains signed-in to the central system 206 and able to view the seller's regular product offerings.

Alternatively, at block 304, if active offers are available for an identified user—e.g. the central system recognizes that a printed product advertisement having special offers was sent to the identified user—then the method flow continued to block 306 where the central system 206 communicates with the application running on the user's smartphone to cause a camera icon or other indicator to be displayed to the user notifying them that special offers are available to them and that a scan-to-buy functionality is available to them.

At decision block 308, the system waits for the user to activate the camera on their phone and capture a digital image of the printed product advertisement having the product depictions associated with product offers available to the customer/user using the scan-to-buy icon presented on their smartphone.

At block 310, when the user has selected the icon, the camera and smartphone capture a digital image of the printed product advertisement. As described previously, the captured digital image is transmitted from the users smartphone via a communications link 202, through a network 204, and to the central system 206 for processing by the image recognition engine 206.

Figure 7:
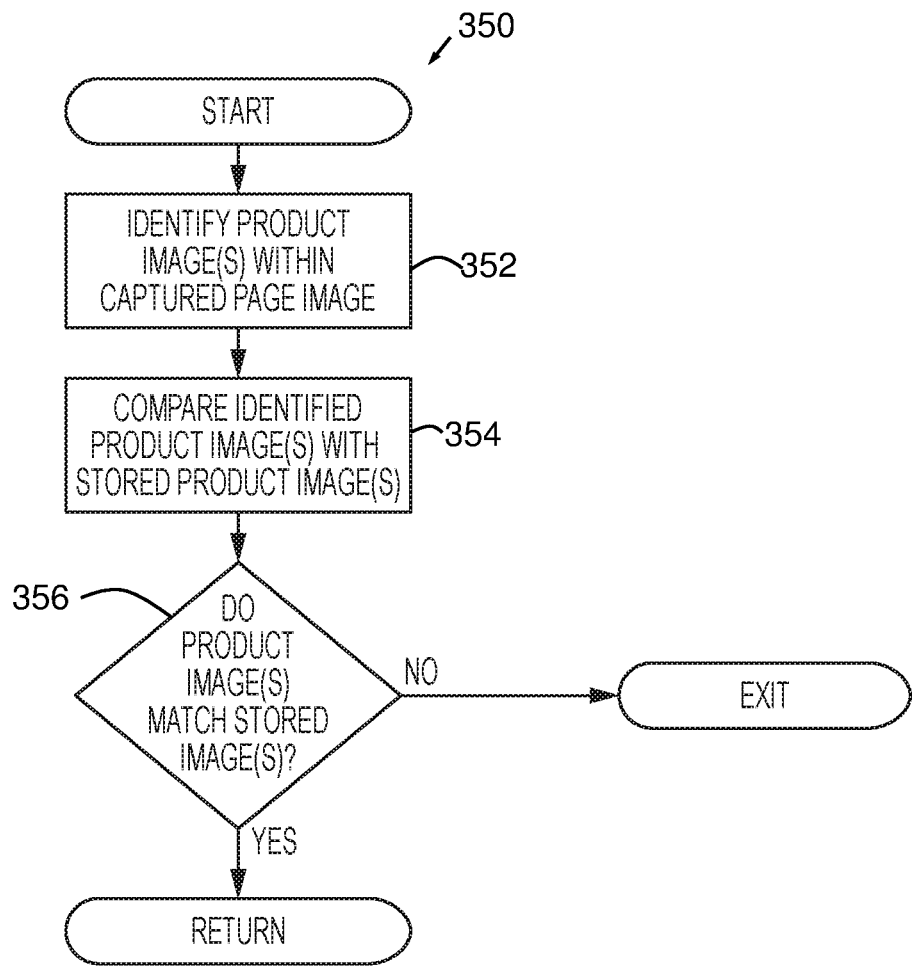
FIG. 7 is a flow diagram of an image recognition engine for identifying depictions associated with products in accordance with an exemplary embodiment of the system and method of the present invention.

Turning to FIG. 7, a flow diagram of the image recognition engine begins at block 352 where the captured digital image is processed and parsed to identify one or more individual depictions of products in the digital image.

At block 354, the identified product depictions are compared with images or depictions stored on the storage device 210 in association with particular product offers and/or in association with particular customers or groups of customers. At block 356, if any identified product depictions match any stored images or depictions for the user, the offer or offers associated with those matched depictions are transmitted to the user from the central system for presentation to the user. If no matches are found for the depictions identified, or if no depictions at all are identified, then no offers are presented to the user and the user preferably remains signed-in to the central system 206 and able to view the seller's regular product offerings.

Returning to FIG. 6, with the image recognition engine of block 312 completed, at block 314 any offers identified for the user—i.e., the offers matching the product depictions identified by the image recognition engine—are presented to the user, preferably by displaying a listing of offers on the user's smartphone device. The users, presented with the list of offers, selects one or more of the offers by clicking or selecting the desired offer or offers on the screen of the smartphone.

At block 316, with one or more offers selected, the user is presented with a buy now or checkout button which instigates a purchase of the product, products, or subscriptions that the user has selected in a manner that is known in the art.

Thus, in accordance with the method just described, a user in possession of a printed product advertisement 100 as described above, using their smartphone device, captures an image of the printed advertisement and is presented with one or more offers associated with the product depictions on the advertisement based on recognition of the images/depictions on the advertisement, without the use of barcodes or QR codes. Upon selection of one or more offers, the user is directed to a checkout where the selected product(s) are purchased.

Other variations of the method just described are contemplated by the present invention. For example, in one alternative embodiment, the printed product advertisement may include a single depiction or image associated with a single offer for that user, in which case upon recognition of that depiction the user is presented directly with a buy now option without having to select from among multiple offers. This and other variations are within the scope of the present invention.

With reference to FIGS. 8 through 14, a method of image recognition product ordering in accordance with an exemplary embodiment of the present invention will be described with reference to a user smartphone device such as a user smartphone device 200 depicted in FIGS. 1 through 5 and discussed above.

Figure 8:
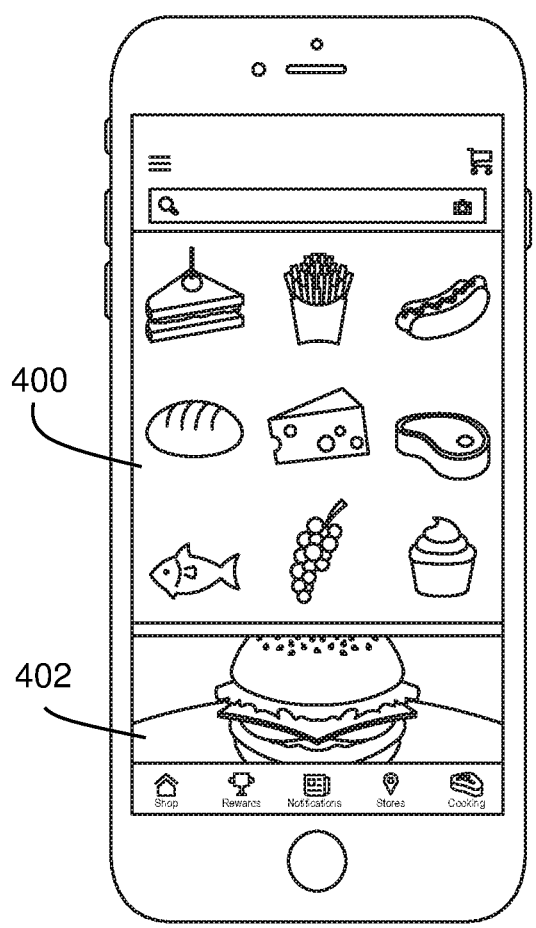
FIG. 8 is a depiction of an exemplary display screen of a smart phone application presented to a user upon initiating operation of the application in accordance with an exemplary implementation of the system and method of the present invention.

Looking to FIG. 8, a display screen for an application running on a smartphone displays an upper main screen portion 400 in which a web page for a seller of products appears, preferably with links to other pages within the website and with images of various products for sale. A lower screen portion 402 similarly initially displays a home page of the seller, typically depicting products for sale.

As discussed above, a user of the application running on the smartphone is preferably logged in to the seller's central system, as discussed above, using a username and password, such that the central system has information about the user and offers sent to the user.

Figure 9:
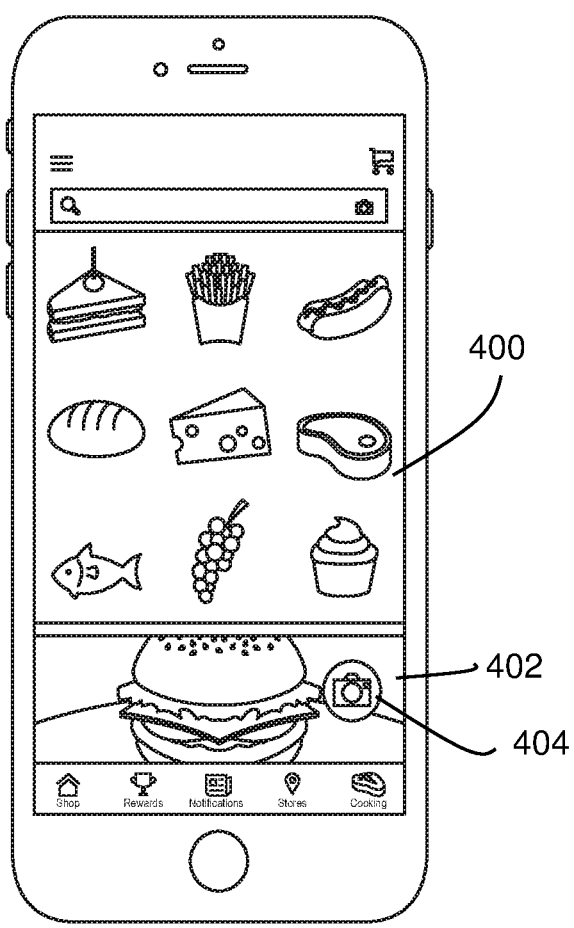
FIG. 9 is a depiction of an exemplary display screen of a smart phone application presented to a user upon identification of the user by the central system and initiation of an image capture mode in accordance with an exemplary implementation of the system and method of the present invention.
Figure 10:
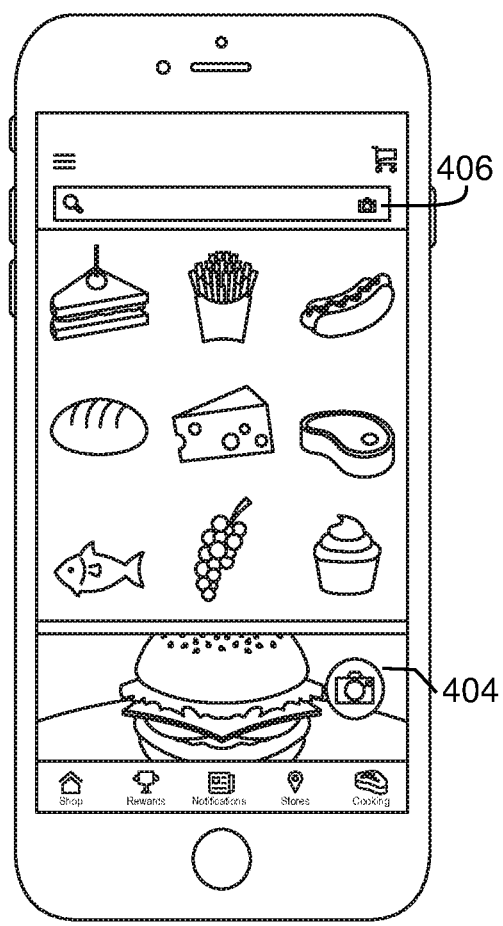
FIG. 10 is a depiction of an exemplary display screen of a smart phone application presented to a user upon selecting a presented camera icon to launch a scan to buy implementation of the system and method of the present invention.
Figure 11:
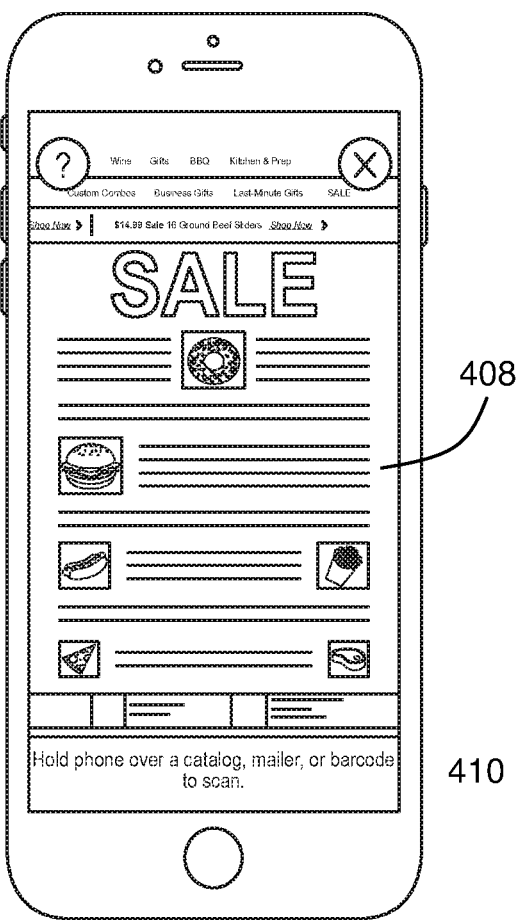
FIG. 11 is a depiction of an exemplary display screen of a smart phone application presented to a user capturing an image of a printed advertisement in accordance with an exemplary implementation of the system and method of the present invention.

Turning to FIG. 9, with a user logged in and identified as having received a printed product advertisement, the application presents a camera icon 404 indicating that the user is eligible and ready to use the scan to buy feature. As seen in FIG. 10, a user may use the presented camera icon 404 or the camera icon 406 associated with the search bar to instigate the scan to buy feature and activate the camera built in to the smartphone device.

As seen in FIG. 10, upon activating the scan to buy feature a user positions the camera's field of view to encompass the printed product advertisement page, or a portion of that page, as described above. The view of the printed product advertisement captured by the camera's field of view is displayed 408 on the screen of the device, with a notification text box 410 instructing the user to hold the phone over the catalog page or mailer.

Figure 12:
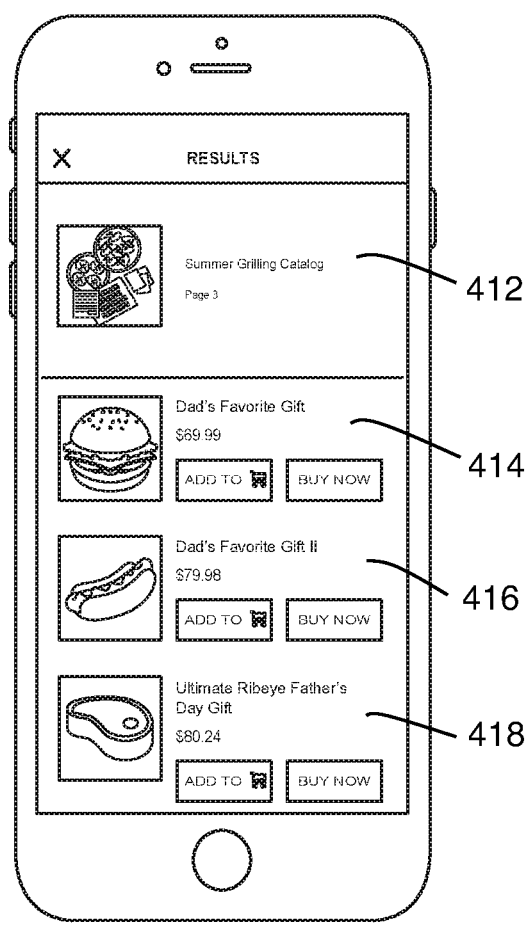
FIG. 12 is a depiction of an exemplary display screen of a smart phone application presented to a user showing one or more offers available to the user based on the captured digital image in accordance with an exemplary implementation of the system and method of the present invention.

Looking to FIG. 12, with an image of the printed product advertisement captured, the image is sent via the communications link to the central system as described previously, where the image recognition engine identifies depictions within the printed page and correlates and/or matches the identified depiction with product offers available to the user logged in to the system. Those offers are transmitted back to the user's device in a manner as previously described and presented to the user in the form of a list of available offers, 414, 416, 418. Preferably the central system and/or the application on the smartphone further display an image 412 of either the printed product advertisement from which the offers originated, or an image of additional offers or advertising. As further seen in FIG. 12, the list of available offers 414, 416, 418 each include a buy it now and add to cart button to allow the user to select offers for immediate or later purchase. As discussed above, the offers may be either one-time purchases of product, or subscriptions to periodic shipment of product.

Figure 13:
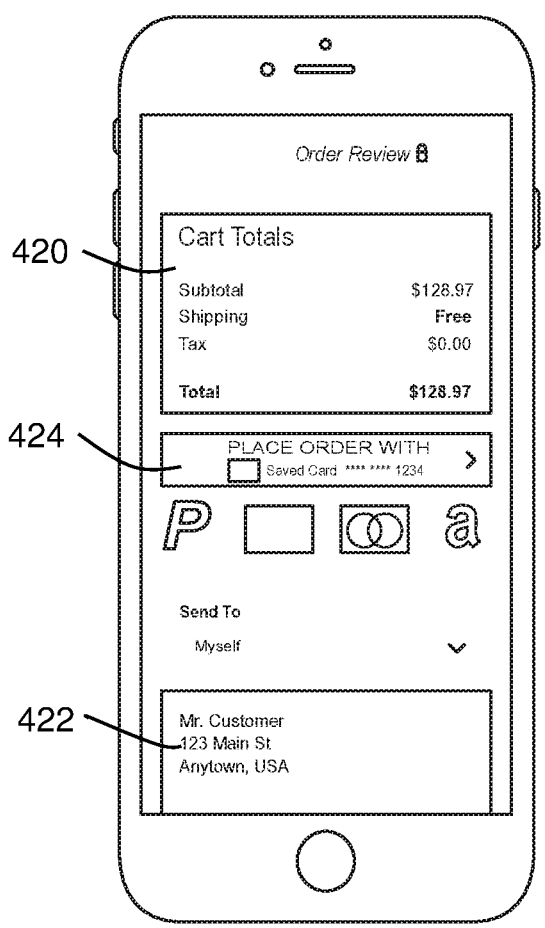
FIG. 13 is a depiction of an exemplary display screen of a smart phone application presented to a user showing a check-out screen corresponding to offers selected by the user in accordance with an exemplary implementation of the system and method of the present invention.
Figure 14:
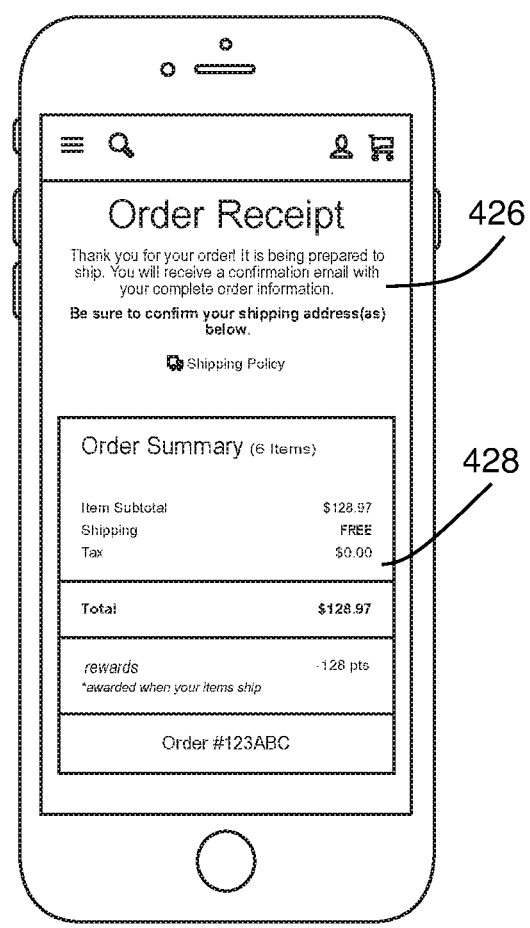
FIG. 14 is a depiction of an exemplary order confirmation and check out screen of a smart phone application presented to a user upon completion of an order or subscription in accordance with an exemplary implementation of the system and method of the present invention.

Looking to FIG. 13, with one or more offers selected, a user is presented with a cart total 420 display, a place order button 424, and a confirmation of user or shipping address 422. Once the order is placed, at FIG. 14 the user is presented with an order receipt 426 and summary 428 of the one-time of recurring order.

From the above, it can be seen that the system and method of the present invention is well-suited to provide offers for the purchase of products for delivery and/or subscriptions to the periodic delivery of products tailored to individual users or to groups or tiers of users. Product ordering or subscriptions are instigated by a user scanning printed advertising material having images or depictions of available products, with an image recognition engine identifying those depictions and matching those depictions to offers available to a particular user. The offers available to a user are displayed on the screen of their smartphone, with each offer available by selecting and checking out.

In alternative embodiments, offers for non-identifiable users, or users who have not yet registered with the seller are presented when the central system does not recognize a particular user. In further embodiments, the ordering of product is automatic, with an order or subscription for product instigated immediately upon scanning of the printed product advertisement by the user.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A system for ordering product or subscribing to periodic product delivery using image recognition, comprising:
   a communications link which receives a captured image from a user of the system, wherein the captured image comprises one or more depictions associated with one or more identifiable products;
   a storage device, comprising a non-transitory computer readable medium, which stores a plurality of depictions associated with one or more of a plurality of products and a plurality of purchase or subscription offers associated with one or more of the plurality of depictions;
   an image recognition engine comprising a processor which identifies one or more depictions in the received captured image and correlates the one or more identified depictions with a corresponding one of the plurality of products and with one or more of the plurality of purchase or subscription offers associated with that corresponding one of the plurality of products; and
   an order initiation unit using a processor which instigates an order of product based on a correlation of an identified depiction with one of the stored plurality of products and a corresponding one of the plurality of purchase or subscription offers associated with that one of the plurality of products, wherein the order is instigated automatically upon scanning of the printed product advertisement by the user.

2. The system of claim 1, wherein the captured image comprises a digital image depiction of at least a portion of a product advertisement and wherein the captured image originates at a user's smartphone, digital camera, or other image capturing device.

3. The system of claim 1, wherein the storage device further stores information associated with a plurality of users of the system and wherein the one or more plurality of purchase or subscription offers is variable based on the user of the system.

4. The system of claim 1, wherein the order initiation unit transmits order information to the seller via the communication link.

5. The system of claim 1, wherein the order of a product comprises a one-time order, a subscription order, and combinations thereof.

6. The system of claim 1, wherein the processor of the image recognition engine and the processor of the order initiation unit comprises a single processor or multiple processors.

7. The system of claim 1, wherein the storage device, the image recognition engine, and the order initiation unit are co-located.

* * * * *